United States Patent
Day, II et al.

(10) Patent No.: US 8,819,677 B2
(45) Date of Patent: Aug. 26, 2014

(54) VIRTUAL MACHINE DATA STRUCTURES CORRESPONDING TO NESTED VIRTUALIZATION LEVELS

(75) Inventors: Michael D. Day, II, Cary, NC (US); Anthony N. Liguori, Austin, TX (US); Ryan A. Harper, Austin, TX (US); John M. Borkenhagen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 851 days.

(21) Appl. No.: 12/953,135

(22) Filed: Nov. 23, 2010

(65) Prior Publication Data

US 2012/0131574 A1 May 24, 2012

(51) Int. Cl.
*G06F 9/455* (2006.01)

(52) U.S. Cl.
CPC .. *G06F 9/45558* (2013.01); *G06F 2009/45566* (2013.01)
USPC .......................................................... 718/1

(58) Field of Classification Search
USPC .......................................................... 718/1
See application file for complete search history.

(56) References Cited

U.S. PATENT DOCUMENTS

| | | | |
|---|---|---|---|
| 4,253,145 A * | 2/1981 | Goldberg ........................ | 703/21 |
| 6,496,847 B1 | 12/2002 | Bugnion et al. | |
| 2005/0210467 A1 | 9/2005 | Zimmer et al. | |
| 2005/0289542 A1 | 12/2005 | Uhlig et al. | |
| 2007/0028238 A1 * | 2/2007 | Bennett et al. .................... | 718/1 |
| 2007/0050764 A1 * | 3/2007 | Traut ................................ | 718/1 |
| 2008/0288940 A1 | 11/2008 | Adams et al. | |
| 2008/0288941 A1 | 11/2008 | Adams et al. | |
| 2009/0007112 A1 | 1/2009 | Moriki et al. | |
| 2009/0172661 A1 * | 7/2009 | Zimmer et al. .................. | 718/1 |
| 2009/0249053 A1 | 10/2009 | Zimmer et al. | |
| 2011/0153909 A1 * | 6/2011 | Dong ................................ | 711/6 |

OTHER PUBLICATIONS

Uhlig et al., "Intel Virtualization Technology," IEEE Computer Society, year 2005.

* cited by examiner

*Primary Examiner* — Diem Cao
(74) *Attorney, Agent, or Firm* — Steven Bennett

(57) ABSTRACT

A system includes a processor providing hardware virtualization, and a memory to store a first virtual machine data structure corresponding to a first nested virtualization level and a second virtual machine data structure corresponding to a second nested virtualization level. The virtual machine data structures assist management of the hardware virtualization provided by the processor. The system includes a first nested virtual machine located within the first nested virtualization level and a second nested virtual machine located within the second nested virtualization level. The system includes hypervisors to manage the nested virtual machines using the virtual machine data structures. A root hypervisor is to manage the first nested virtual machine using the first virtual machine data structure. A first nested virtualization level hypervisor is to run within the first nested virtual machine and is to manage the second nested virtual machine using the second virtual machine data structure.

17 Claims, 2 Drawing Sheets

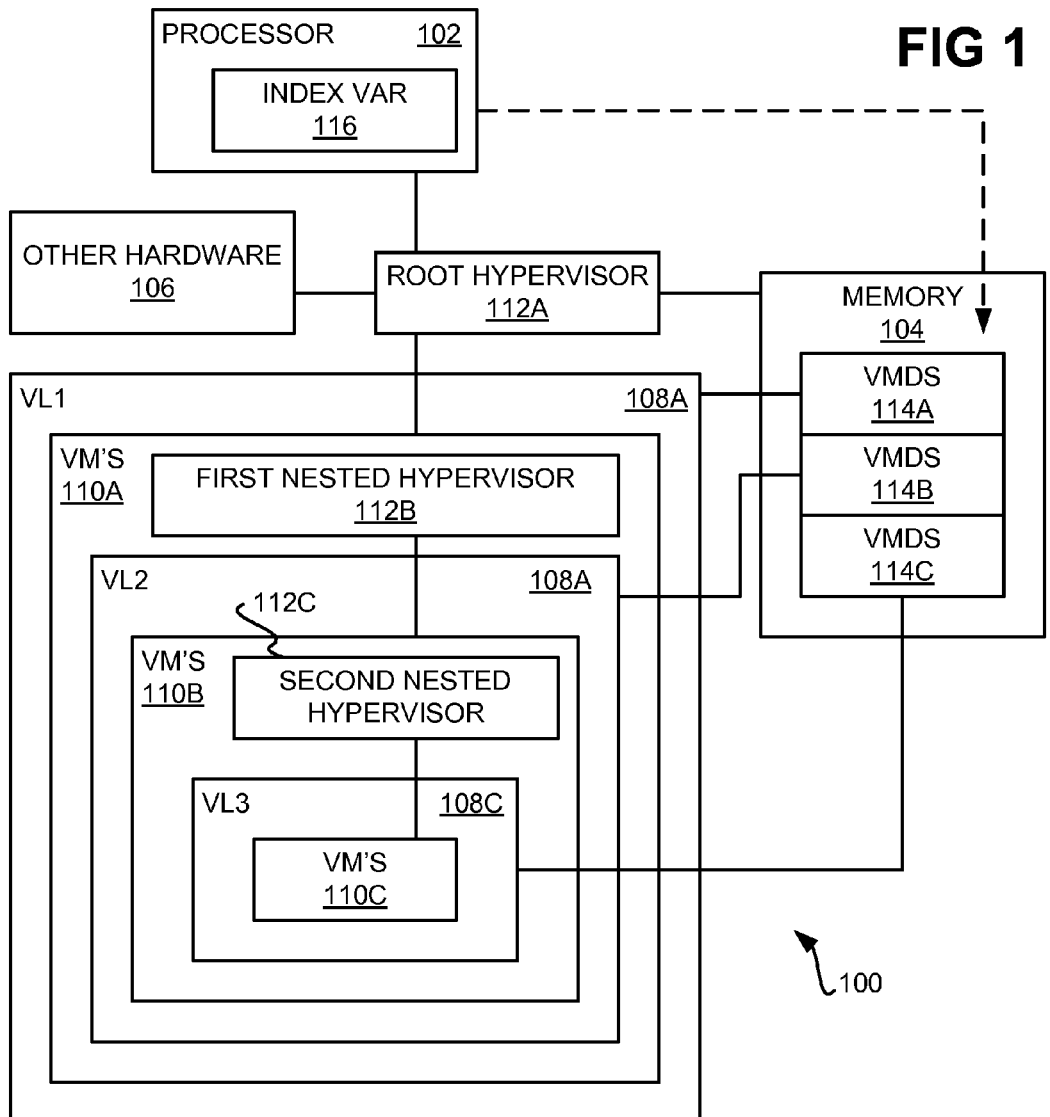
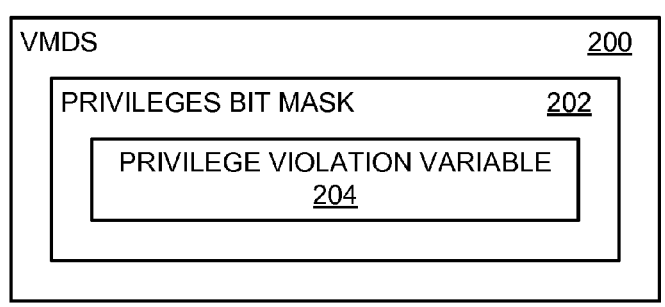

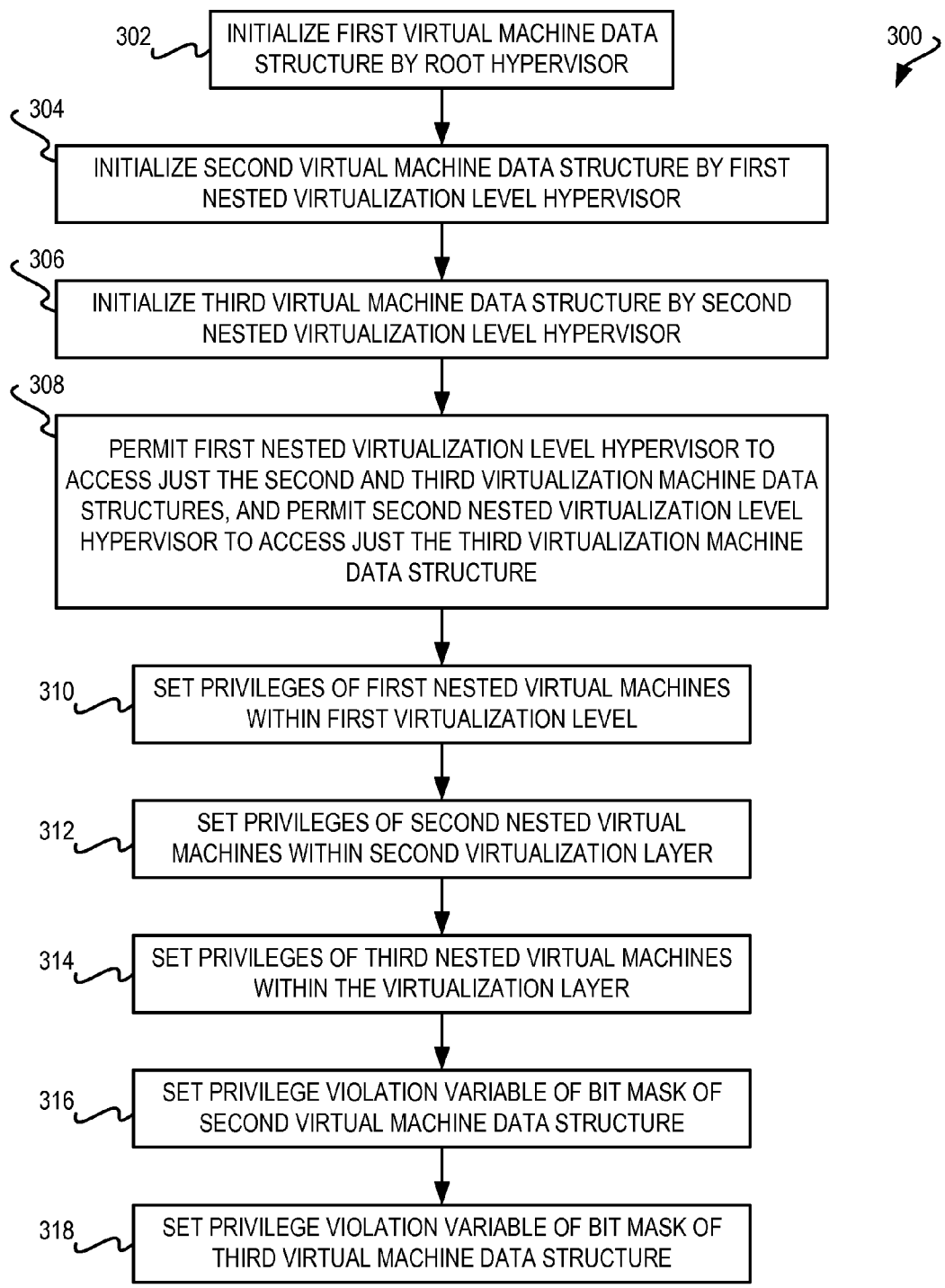

VIRTUAL MACHINE DATA STRUCTURES CORRESPONDING TO NESTED VIRTUALIZATION LEVELS

BACKGROUND

A computing device typically runs one instance of an operating system that has access to the hardware resources of the computing device. However, a technique known as virtualization permits a number of instances of operating systems to run on a computing device. In virtualization, a number of virtual machines are instantiated, and each virtual machine runs its own instance of an operating system. A program known as a hypervisor, or virtual machine monitor, virtualizes the hardware resources of the computing device for access by the virtual machines. As such, the operating system of each virtual machine may be unaware that it is running within a virtual machine and that other operating systems are running on other virtual machines on the computing device.

SUMMARY OF THE INVENTION

A system of an embodiment of the invention includes a processor providing hardware virtualization, and a memory to store virtual machine data structures corresponding to nested virtualization levels. The nested virtualization levels include a first nested virtualization level and a second nested virtualization level nested within the first nested virtualization level. The virtual machine data structures include a first virtual machine data structure corresponding to the first nested virtualization level and a second virtual machine data structure corresponding to the second nested virtualization level. The virtual machine data structures assist management of the hardware virtualization provided by the processor.

The system includes nested virtual machines located within the nested virtualization levels. The nested virtual machines include a first nested virtual machine located within the first nested virtualization level and a second nested virtual machine located within the second nested virtualization level. The system includes hypervisors to manage the nested virtual machines using the virtual machine data structures. The hypervisors include a root hypervisor to manage the first nested virtual machine using the first virtual machine data structure. The hypervisors also include a first nested virtualization level hypervisor to run within the first nested virtual machine and to manage the second nested virtual machine using the second virtual machine data structure.

A method of an embodiment of the invention initializes a first virtual machine data structure, by a root hypervisor running on a processor providing hardware virtualization. The first virtual machine data structure corresponds to a first nested virtualization level in which a first nested virtual machine is located. The method initializes a second virtual machine data structure, by a first nested virtualization level hypervisor running within the first nested virtual machine. The second virtual machine data structure corresponds to a second nested virtualization level in which a second nested virtual machine is located. The method permits the root hypervisor to access the first virtual machine data structure or the second virtual machine data structure. The method also permits the first nested virtualization level hypervisor to access the second virtual machine data structure but not the first virtual machine data structure. The first virtual machine data structure and the second virtual machine data structure assist management of the hardware virtualization provided by the processor.

A computer program product of an embodiment of the invention includes a computer-readable storage medium having computer-readable code embodied therein. The computer-readable code is executable by a processor providing hardware virtualization. The computer-readable code includes first computer-readable code encompassing a root hypervisor to initialize a first virtual machine data structure corresponding to a first nested virtualization level in which a first nested virtual machine is located. The computer-readable code includes second computer-readable code encompassing a first nested virtualization level hypervisor running within the first nested virtual machine to initialize a second virtual machine data structure corresponding to a second nested virtualization level in which a second nested virtual machine is located. The computer-readable code includes third computer-readable code permit to the root hypervisor to access the first virtual machine data structure or the second virtual machine data structure, and to permit the first nested virtualization level hypervisor to access the second virtual machine data structure but not the first virtual machine data structure. The first virtual machine data structure and the second virtual machine data structure assist management of the hardware virtualization provided by the processor.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 1 is a diagram of a computing system on which multiple virtual machines are run within multiple nested virtualization levels, according to an embodiment of the invention.

FIG. 2 is a diagram of a virtual machine data structure that can be used in the computing system of FIG. 1, according to an embodiment of the invention.

FIG. 3 is a flowchart of a method for running multiple virtual machines within multiple nested virtualization levels, according to an embodiment of the invention.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background, virtualization permits a number of instances of operating systems to run on a computing device. Some types of processors of computing devices provide for hardware virtualization. For example, some processors manufactured by Intel Corp., of Santa Clara, Calif., include virtual machine control structures, and some processors manufactured by Advanced Micro Devices, Inc., of Sunnyvale, Calif., include virtual machine control blocks.

These virtual machine control structures and virtual machine control blocks are generically referred to herein as virtual machine data structures. The virtual machine data structures of such processors provide for faster execution of virtual machines, since some of the overhead involved in maintaining virtual machines is offloaded from software directly to the hardware of the processors.

In some types of virtualization, the virtual machines within which the operating systems run may be nested over a number of nested virtualization levels. For example, a root hypervisor runs on the computing device, and manages the creation and deletion of first virtual machines within a first nested virtualization level. A first nested virtualization level hypervisor may itself run on one of these first virtual machines, and manage the creation and deletion of second virtual machines within a second nested virtualization level within the first nested virtualization level.

A difficultly with using nested virtualization levels is that the hardware virtualization that may be provided by the processor of the computing device cannot be employed. The virtual machine data structures of some types of existing processors, such as those manufactured by Intel Corp. and Advanced Micro Devices, Inc., implicitly assume a single level of virtualization, and not multiple nested levels of virtualization. Existing techniques to overcome this deficiency, such as those techniques known as trap-and-emulate and dynamic translation, can be overly complex, making them difficult to implement, and can result in high overhead, resulting in a slowdown of the running of the virtual machines.

By comparison, embodiments of the invention employ a number of virtual machine data structures. Each virtual machine data structure corresponds to a nested virtualization level. The virtual machine data structures may be organized as an array that is indexed by an index variable stored within a processor. Therefore, when a virtual machine within a given nested virtualization level is currently being executed by the processor, the index variable is set to a value corresponding to this nested virtualization level. As such, the hardware virtualization of the processor is leveraged even when there are nested virtualization levels. The inventive technique is not as difficult to implement, and does not require as high overhead, as compared to existing techniques to provide for multiple nested levels of virtualization.

FIG. 1 shows a computing system 100, according to an embodiment of the invention. The system 100 may be implemented as one or more computing devices, such as server computing devices, desktop computing devices, and so on. The computing system 100 includes a processor 102, memory 104, as well as other hardware 106. The processor 102 is capable of providing hardware virtualization, such as that provided by x86 processors by Intel and AMD that include virtual machine control structures and virtual machine control blocks, respectively. The memory 104 can include volatile as well as non-volatile memory. The other hardware 106 can includes input/output (I/O) devices, chipset devices, and other types of devices.

The computing system 100 includes a number of nested virtualization levels 108A, 108B, and 108C, within which nested virtual machines 110A, 110B, and 110C, respectively, are located. The nested virtualization levels 108A, 108B, and 108C are collectively referred to as the nested virtualization levels 108, and the nested virtual machines 110A, 110B, and 110C are collectively referred to as the nested virtual machines 110. There are at least two virtualization levels 108, although three virtualization levels 108 are exemplarily depicted in FIG. 1. Within each virtualization level 108, there is at least one virtual machine 110.

A virtual machine 110 can be considered as a "machine within a machine," and functions as if it owned the entire computing system 100. Each virtual machine 110 includes an instance of the same or a different operating system, along with one or more application programs. The operating systems are referred to as guest operating systems. The virtual machines 110 are run simultaneously on the computing system 100.

The virtual machines 110 are nested in that the virtual machines 110B run within the virtual machines 110A, and the virtual machines 110C run within the virtual machines 110B. As such, the virtual machines 110B can each be considered as a "virtual virtual machine," in that each virtual machine 110B is a virtualization of a virtual machine 110A. Similarly, the virtual machines 110C can each be considered as a "virtual virtual virtual machine," in that each virtual machine 110C is a virtualization of a virtual machine 110B, which itself is a virtualization of a virtual machine 110A.

The computing system 100 includes hypervisors 112A, 112B, and 112C, which are collectively referred to as the hypervisors 112, and which may also be referred to as virtual machine monitors. The hypervisors 112 manage the virtual machines 110, including creating and deleting virtual machines 110 as needed. The hypervisors 112 also virtualize the hardware of the computing system 100, including the processor 102, the memory 104, and the other hardware 106, so that this hardware is accessible to the virtual machines 110.

More specifically, the hypervisors 112 include a root hypervisor 112A, a first nested virtualization level hypervisor 112B, and a second nested virtualization level hypervisor 112C. The root hypervisor 112 runs directly on the computing system 100, as opposed to on a virtual machine. The root hypervisor 112 manages the first virtual machines 110A within the first nested virtualization level 108A. The first nested virtualization level hypervisor 112B runs on the computing system 100 within the first nested virtualization level 108A. The first nested virtualization level hypervisor 112B manages the second virtual machines 110B within the second nested virtualization level 108B; the root hypervisor 112 can also manage the second virtual machines 110B. Similarly, the second nested virtualization level hypervisor 112C runs on the computing system 100 within the second nested virtualization level 108B, and manages the third virtual machines 110C within the third nested virtualization levels 108C. The root hypervisor 112 and the first nested virtualization level hypervisor 112B can also manage the third virtual machines 110C.

The memory 104 of the computing system 100 stores virtual machine data structures 114A, 114B, and 114C, which are collectively referred to as the virtual machine data structures 114, and which correspond to the nested virtualization levels 108A, 108B, and 108C, respectively. Each of the virtual machine data structures 114 can be a virtual machine control structure, in the case where the processor 102 is an Intel x86 processor, or a virtual machine control block, in the case where the processor 102 is an AMD x86 processor. Most generally, the virtual machine data structures 114 assist management of the hardware virtualization provided by the processor 102. The hypervisors 112 thus manage the virtual machines 110 using these virtual machine data structures 114.

In the case of an Intel x86 processor, the virtual machine control structure is loaded from the memory 104 into the processor 102. By comparison, in the case of an AMD x86 processor, the virtual machine control block remains in the memory 104 at all times. Most generally, then, the virtual machine data structures 114 are stored in the memory 104, and they are manipulated either directly from the memory 104, or they are manipulated by first being loaded from the memory 104 into the processor 102.

For instance, the virtual machines 110A within the nested virtualization level 108A are managed using the virtual machine data structure 114A. Similarly, the virtual machines 110B within the nested virtualization level 108B are managed using the virtual machine data structure 114B, and the virtual machines 110C within the nested virtualization level 108C are managed using the virtual machine data structure 114C. There is thus a virtual machine data structure 114 for each nested virtualization level 108.

Therefore, the root hypervisor 112A virtualizes the hardware of the computing system 100 for and manages the virtual machines 110A within the nested virtualization level 108A, as well as the virtual machines 110B within the nested virtualization level 108B and the virtual machines 110C within the nested virtualization level 10C. The first nested virtualization level hypervisor 112B virtualizes the hardware of the computing system 100 (as has already been virtualized by the root hypervisor 112A for the virtual machines 110A) and manages the virtual machines 110B within the nested virtualization level 108B. The first nested virtualization level hypervisor 112B can also manage the virtual machines 110C within the nested virtualization level 108C, but cannot manage the virtual machines 110A within the nested virtualization level 108A.

The second nested virtualization level hypervisor 112C virtualizes the hardware of the computing system 100 (as has already been virtualized twice, by the root hypervisor 112A for the virtual machines 110A and then by the hypervisor 112B for the virtual machines 110B) and manages the virtual machines 110C within the nested virtualization level 108C. The second nested virtualization level hypervisor 112C cannot manage the virtual machines 110A within the nested virtualization level 108A, or the virtual machines 110B within the nested virtualization level 108B. That is, each hypervisor 112 may manage the virtual machines 110 within its corresponding nested virtualization level 108, as well as any virtual machines 110 within higher nested virtualization levels 108. However, each hypervisor 112 cannot manage virtual machines 110 within lower nested virtualization levels 108.

The processor 102 stores an index variable 116, such as within a register of the processor 102. In one embodiment, the value of the index variable 116 can be incremented by any hypervisor 112, but just the root hypervisor 112A can decrement the value the value of the index variable 116. The value of the index variable 116 indicates which of the virtual machine data structures 114 is currently operative. That is, the current value of the index variable 116 indicates the current virtual machine data structure 114, and thus the current nested virtualization level 108 including the virtual machine 110 that is currently being run.

For instance, the virtual machine data structures 114 may be organized as an array, where the index variable 116 serves to index the array. Setting the index variable 116 to a first value selects the virtual machine data structure 114A for the virtual machines 110A within the first nested virtualization level 108A. Similarly, setting the index variable 116 to a second value selects the virtual machine data structure 114B for the virtual machines 110B within the second nested virtualization level 108A, and setting the variable 116 to a third value selects the virtual machine data structure 114C for the virtual machines 110C within the third virtualization level 108C.

In this way, then, the hardware virtualization provided by the processor 102 can be provided even when the virtual machines 110 are nested over multiple virtualization levels 108. The virtual machines 110 at one virtualization level 108 can have different virtualization settings as compared to the virtual machines 110 at a different virtualization level 108. This is because the former virtual machines 110 are managed using one virtual machine data structure 114, whereas the latter virtual machines 110 are managed using a different virtual machine data structure 114.

The virtual machine data structures 114 may also be considered as being organized within a stack. As depicted in FIG. 1, the stack of virtual machine data structures 114 are organized so that higher-privileged virtual machine data structures 114 are located at the top of the stack and so that lower-privileged virtual machine data structures 114 are located at the bottom of the stack. The stack itself can be organized as an array, as has been described.

By having the virtual machine data structures 114 organized as a stack, the virtual machine data structures 114 are organized in accordance with a privilege hierarchy. Each hypervisor 112 can access virtual machine data structures 114 at a corresponding privilege level, and at privilege levels below its corresponding privilege level, but not at privilege levels above its corresponding privilege levels. For example, the hypervisor 112B can access the virtual machine data structures 114B and 114C, but not the virtual machine data structure 114A. This is because the hypervisor 112B and the virtual machine data structure 114B are at the same privilege level, and the virtual machine data structure 114C is at a lower privilege level than the hypervisor 112B, whereas the virtual machine data structure 114A is at a higher privilege level than the hypervisor 112B.

Similarly, the hypervisor 112A can access the virtual machine data structures 114A, 114B, and 114C. This is because the hypervisor 112A and the virtual machine data structure 114A are at the same privilege level, and the virtual machine data structures 114B and 114C are at lower privilege levels than the hypervisor 112A. The hypervisor 112C can access the virtual machine data structure 114C, but not the virtual machine data structures 114A and 114B. This is because the hypervisor 112C and the virtual machine data structure 114C are at the same privilege level, and the virtual machine data structures 114A and 114B are at higher privilege levels than the hypervisor 112C.

FIG. 2 shows a virtual machine data structure 200 in more detail, according to an embodiment of the invention. The virtual machine data structure 200 can serve as any of the virtual machine data structures 114 of FIG. 1. The virtual machine data structure 200 includes a privileges bit mask 202, which itself includes a privilege violation variable 204.

The privileges bit mask 202 corresponds to the privileges of the nested virtual machines 110 within the nested virtualization level 108 to which the virtual machine data structure 200 corresponds. For instance, the privileges bit mask 202 of the virtual machine data structure 114A corresponds to the privileges of the virtual machines 110A within the virtualization level 108A. Likewise, the privileges bit mask 202 of the virtual machine data structure 114B corresponds to the privileges of the virtual machines 110B within the virtualization level 108B, and the privileges mask 202 of the virtual machine data structure 114C corresponds to the privileges of the virtual machines 110C within the virtualization level 108C.

The privileges indicate which hardware virtualization instructions of the processor 102 that these virtual machines 110 are permitted to execute. The processor 102 provides hardware virtualization by providing a set of such hardware virtualization instructions. However, it may not be desired to permit the virtual machines 110 of a given nested virtualization level 108 to access all the hardware virtualization instructions. By appropriately setting the bit mask 202, then, which of the instructions the virtual machines 110 within the nested virtualization level 108 to which the virtual machine data structure 200 corresponds can execute can be specified.

If a virtual machine 110 nevertheless attempts to execute a hardware virtualization instruction that it does not have privileges for, then the processor 102 notifies one of the hypervisors 112. The privilege violation variable 204 of the privileges bit mask 202 indicates the hypervisor 112 to which execution is to proceed upon the virtual machine 110 violating the privileges that have been accorded to the virtual machine 110. For a virtual machine 110 within a given virtualization level 108, the privilege violation variable 204 of the virtual machine data structure 114 corresponding to this virtualization level 108 can specify the hypervisor 112 managing this virtualization level 108, or any preceding virtualization level 108.

For instance, the privilege violation variable 204 of the virtual machine data structure 114A can specify just the root hypervisor 112A that manages the corresponding virtualization level 108A. By comparison, the privilege violation variable 204 of the virtual machine data structure 114B for the corresponding virtualization level 108B can be set to one of two different values. The first value indicates that the hypervisor 112B managing the virtualization level 108B is to be notified (i.e., having execution proceeded thereto) upon a privilege violation, whereas the second value indicates that the root hypervisor 112A is to be notified. The privilege violation variable 204 of the virtual machine data structure 114C for the corresponding virtualization level 108C can also be set to a third value, indicating that the hypervisor 112C managing the virtualization level 108C is to be notified upon a privilege violation.

In practice, then, as the processor 102 changes its execution context from one virtual machine 110 to another virtual machine 110, the value of the index variable 116 is correspondingly changed if the change in execution context results in a change in the current virtualization level 108. For example, when the processor 102 switches its context from a virtual machine 110A to a virtual machine 110B, the value of the index variable 116 is changed to specify the virtual machine data structure 114B instead of the virtual machine data structure 114C. This is because the virtual machine 110A is within the virtualization level 108A, whereas the virtual machine 110B is within the different virtualization level 108B. By comparison, when the processor 102 switches its context from one virtual machine 110A to another virtual machine 110B, the value of the index variable 116 does not change.

FIG. 3 shows a method 300, according to an embodiment of the invention. The root hypervisor 112A initializes the first virtual machine data structure 114A that corresponds to the first nested virtualization level 108A in which the first nested virtual machines 110A are located (302). Similarly, the first nested virtualization level hypervisor 112B initializes the second virtual machine data structure 114B that corresponds to the second nested virtualization level 108B in which the second nested virtual machines 110B are located (304), and the second nested virtualization level hypervisor 112C initializes the third virtual machine data structure 114C (306).

The root hypervisor 112A is able to access all three virtual machine data structures 114. By comparison, the first nested virtualization level hypervisor 112B is permitted to access just the second and third virtual machine data structures 114B and 114C, and not the first virtual machine data structure 114A. Likewise, the second nested virtualization level hypervisor 112C is permitted to access just the third virtual machine data structure 114C, and not the first and the second virtual machine data structures 114A and 114B (308).

The initialization of the virtual machine data structures 114 can include the following. First, the privileges of the first nested virtual machines 110A within the first virtualization level 108A are set by setting the privileges bit mask 202 of the first virtual machine data structure 114A, by the root hypervisor 112 (310). The privileges of the second nested virtual machines 110B within the second virtualization level 108B are set by the setting the privileges bit mask 202 of the second virtual machine data structure 114B, by the hypervisor 112B (312). The privileges of the third nested virtual machines 110C within the third virtualization level 108C are set by setting the privileges bit mask 202 of the third virtual machine data structure 114C, by the hypervisor 112C (314).

The initialization of the virtual machine data structures can also include the following. While the privilege violation variable 204 of the bit mask 202 of the first virtual machine data structure 114A is to be set to specify the root hypervisor 112A, the privilege violation variable 204 of the bit mask 202 of the second virtual machine data structure 114B can be set to one of two different values (316). The first value specifies that execution is to proceed to the root hypervisor 112A upon a privileges violation, whereas the second value specifies that execution is to proceed to the hypervisor 112B upon a privileges violation. The privilege violation variable 204 of the bit mask 202 of the third virtual machine data structure 114C can be set to one of three different values (318), including the first and the second values noted above, as well as to a third value that specifies that execution is to proceed to the hypervisor 112C upon a privileges violation.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A system comprising:
a processor providing hardware virtualization;
a memory to store a plurality of virtual machine data structures corresponding to a plurality of nested virtualization levels including a first nested virtualization level and a second nested virtualization level nested within the first nested virtualization level, the virtual machine data structures including a first virtual machine data structure corresponding to the first nested virtualization level and a second virtual machine data structure corresponding to the second nested virtualization level, the virtual machine data structures to assist management of the hardware virtualization provided by the processor;
a plurality of nested virtual machines located within the nested virtualization levels, the nested virtual machines including a plurality of first nested virtual machines located within the first nested virtualization level and a plurality of second nested virtual machines located within the second nested virtualization level; and,
a plurality of hypervisors to manage the nested virtual machines using the virtual machine data structures, the hypervisors including a root hypervisor to manage all the first nested virtual machines using the first virtual machine data structure for all the first nested virtual machines, the hypervisors including a first nested virtualization level hypervisor to run within the first nested virtual machines and to manage all the second nested virtual machines using the second virtual machine data structure for all the second nested virtual machines,
wherein the first virtual machine data structure includes a privilege violation variable indicating which hypervisor of the hypervisors to which execution is to proceed responsive to a privilege violation by any first nested virtual machine, wherein the second virtual machine data structure includes a privilege violation variable indicating which hypervisor of the hypervisors to which execution is to proceed responsive to a privilege violation by any second nested virtual machine, wherein each virtual machine data structure comprises a bit mask corresponding to privileges of the nested virtual machines located within the nested virtualization level to which the virtual machine data structure corresponds, the privileges indicating which hardware virtualization instructions of the processor the nested virtual machines are permitted to execute.

2. The system of claim 1, wherein the virtual machine data structures are, one of virtual machine control structures and virtual machine control blocks.

3. The system of claim 1, further comprising an index variable to indicate to the processor a current virtual machine data structure corresponding to a current nested virtualization level including a plurality of current nested virtual machines, all of for which the current virtual machine data structure is used.

4. The system of claim 3, wherein the memory is a non-volatile memory, and the virtual machine data structures are organized as an array stored within the non-volatile memory, the array indexed by the index variable.

5. The system of claim 3, wherein the processor comprises a register to store the index variable.

6. The system of claim 3, wherein only the root hypervisor is permitted to decrease the index variable, such that other hypervisors are not permitted to decrease the index variable.

7. The system of claim 3, wherein a first value of the index variable corresponds to the first virtual machine data structure, and a second value of the index variable corresponds to the second virtual machine data structure.

8. The system of claim 1, wherein the root hypervisor is permitted to manage the nested virtual machines located within the first nested virtualization level and the nested virtual machines located within the second virtualization level, and the first nested virtualization level hypervisor is permitted to manage the nested virtual machines located within the second virtualization level but not the nested virtual machines located within the first virtualization level.

9. The system of claim 1, wherein the bit mask of the first virtual machine data structure corresponds to the privileges of the nested virtual machines located within the first nested virtualization level, and the bit mask of the second virtual machine data structure corresponds to the privileges of the nested virtual machines located within the second nested virtualization level.

10. A method comprising:
initializing a first virtual machine data structure, by a root hypervisor running on a processor providing hardware virtualization, the first virtual machine data structure corresponding to a first nested virtualization level in which a plurality of first nested virtual machines are located;
initializing a second virtual machine data structure, by a first nested virtualization level hypervisor running within the first nested virtual machines, the second virtual machine data structure corresponding to a second nested virtualization level in which a plurality of second nested virtual machines are located;
permitting the root hypervisor to access the first virtual machine data structure or the second virtual machine data structure; and,
permitting the first nested virtualization level hypervisor to access the second virtual machine data structure but not the first virtual machine data structure,
wherein the first virtual machine data structure is to assist management of the hardware virtualization provided by the processor for all the first nested virtual machines, and the second virtual machine data structure is to assist management of the hardware virtualization provided by the processor for all the second nested virtual machines,
wherein the first virtual machine data structure includes a privilege violation variable indicating which hypervisor of the hypervisors to which execution is to proceed responsive to a privilege violation by any first nested virtual machine,
wherein the second virtual machine data structure includes a privilege violation variable indicating which hypervisor of the hypervisors to which execution is to proceed responsive to a privilege violation by any second nested virtual machine,
wherein each virtual machine data structure comprises a bit mask corresponding to privileges of the nested virtual machines located within the nested virtualization level to which the virtual machine data structure corresponds, the privileges indicating which hardware virtualization instructions of the processor the nested virtual machines are permitted to execute.

11. The method of claim 10, further comprising maintaining an index variable to indicate to the processor a current virtual machine data structure corresponding to a current nested virtualization level including a plurality of current nested virtual machines, all of for which the current virtual machine data structure is used, wherein a first value of the index variable corresponds to the first virtual machine data structure and a second value of the index variable corresponds to the second virtual machine data structure.

12. The method of claim 10, further comprising:
setting privileges of the first nested virtual machines by setting the bit mask of the first virtual machine data structure, the privileges indicating which hardware virtualization instructions of the processor the first nested virtual machines are permitted to execute; and,
setting privileges of the second nested virtual machines by setting the bit mask of the second virtual machine data structure, the privileges indicating which hardware virtualization instructions of the processor the second nested virtual machines are permitted to execute.

13. The method of claim 12, further comprising:
setting the privilege violation variable of the bit mask of the second virtual machine data structure to a first value to indicate that execution is to proceed to the root hypervisor upon the second nested virtual machines violating the privileges accorded thereto by the bit mask; and,
setting, the privilege violation variable of the bit mask of the second virtual machine data structure to a second value to indicate that execution is to proceed to the first nested virtualization level hypervisor upon the second nested virtual machines violating the privileges according thereto by the bit mask.

14. A computer program product comprising:
a non-transitory computer-readable storage medium having computer-readable code embodied therein, the computer-readable code executable by a processor providing hardware virtualization, the computer-readable code comprising:

first computer-readable code encompassing a root hypervisor to initialize a first virtual machine data structure corresponding to a first nested virtualization level in which a plurality of first nested virtual machines are located;

second computer-readable code encompassing a first nested virtualization level hypervisor running within the first nested virtual machines to initialize a second virtual machine data structure corresponding to a second nested virtualization level in which a plurality of second nested virtual machines are located;

third computer-readable code permit to the root hypervisor to access the first virtual machine data structure or the second virtual machine data structure, and to permit the first nested virtualization level hypervisor to access the second virtual machine data structure but not the first virtual machine data structure, wherein the first virtual machine data structure is to assist management of the hardware virtualization provided by the processor for all the first nested virtual machines, and the second virtual machine data structure is to assist management of the hardware virtualization provided by the processor for all the second nested virtual machines, wherein the first virtual machine data structure includes a privilege violation variable indicating which hypervisor of the hypervisors to which execution is to proceed responsive to a privilege violation by any first nested virtual machine, wherein the second virtual machine data structure includes a privilege violation variable indicating which hypervisor of the hypervisors to which execution is to proceed responsive to a privilege violation by any second nested virtual machine, wherein each virtual machine data structure comprises a bit mask corresponding to privileges of the nested virtual machines located within the nested virtualization level to which the virtual machine data structure corresponds, the privileges indicating which hardware virtualization instructions of the processor the nested virtual machines are permitted to execute.

15. The computer program product of claim 14, wherein the computer-readable code farther comprises fourth computer-readable code to maintain an index variable to indicate to the processor a current virtual machine data structure corresponding to a current nested virtualization level including a plurality of current nested virtual machines, all of for which the current virtual machine data structure is used, wherein a first value of the index variable corresponds to the first virtual machine data structure and a second value of the index variable corresponds to the second virtual machine data structure.

16. The computer program product of claim 14, wherein the first computer-readable code is further to set privileges of the first nested virtual machines by setting the bit mask of the first virtual machine data structure, the privileges indicating which hardware virtualization instructions of the processor the first nested virtual machines are permitted to execute, wherein the second computer-readable code is further to set privileges of the second nested virtual machines by setting the bit mask of the second virtual machine data structure, the privileges indicating which hardware virtualization instructions of the processor the second nested virtual machines are permitted to execute.

17. The computer program product of claim 16, wherein the second computer-readable code is further to:

set the privilege violation variable of the bit mask of the second virtual machine data structure to a first value to indicate that execution is to proceed to the root hypervisor upon the second nested virtual machines violating the privileges accorded thereto by the hit mask; and, set the privilege violation variable of the bit mask of the second virtual machine data structure to a second value to indicate that execution is to proceed to the first nested virtualization level hypervisor upon the second nested virtual machines violating the privileges according thereto by the bit mask.

* * * * *